US012602104B2

(12) United States Patent
Minamino et al.

(10) Patent No.: US 12,602,104 B2
(45) Date of Patent: Apr. 14, 2026

(54) INPUT DEVICE

(71) Applicant: Sony Interactive Entertainment Inc.,
Tokyo (JP)

(72) Inventors: Takanori Minamino, Kanagawa (JP);
Kenzo Nishikawa, Tokyo (JP); **Takeshi
Igarashi, Kanagawa (JP); Yoshiaki
Kawamura**, Chiba (JP)

(73) Assignee: Sony Interactive Entertainment Inc.,
Tokyo (JP)

( * ) Notice: Subject to any disclaimer, the term of this
patent is extended or adjusted under 35
U.S.C. 154(b) by 37 days.

(21) Appl. No.: 17/436,232

(22) PCT Filed: Mar. 17, 2020

(86) PCT No.: PCT/JP2020/011828
§ 371 (c)(1),
(2) Date: Sep. 3, 2021

(87) PCT Pub. No.: WO2020/189691
PCT Pub. Date: Sep. 24, 2020

(65) Prior Publication Data
US 2022/0155848 A1      May 19, 2022

(30) Foreign Application Priority Data

Mar. 18, 2019    (JP) ................................. 2019-050278

(51) Int. Cl.
*G06F 3/01* (2006.01)
(52) U.S. Cl.
CPC ..................................... *G06F 3/01* (2013.01)

(58) Field of Classification Search
None
See application file for complete search history.

(56) References Cited

U.S. PATENT DOCUMENTS 9,983,709 B2    5/2018   Trail
10,635,171 B2   4/2020   Nakamura
(Continued)

FOREIGN PATENT DOCUMENTS

CN        205899500 U     1/2017
EP          2634670 A1    9/2013
(Continued)

OTHER PUBLICATIONS

Extended European Search Report for corresponding EP Application No. 20774631.4, 7 pages, dated Nov. 21, 2022.
(Continued)

*Primary Examiner* — Matthew Yeung
(74) *Attorney, Agent, or Firm* — Kilpatrick Townsend &
Stockton LLP

(57) ABSTRACT

Two light-emitting units are to be prevented from overlapping each other in an image obtained through a camera. A tracked unit (30) has a first outer surface (A1) provided with a first light-emitting unit (H1), a second outer surface (A2) provided with a second light-emitting unit (H2), and a light shield portion (B). The second outer surface (A2) faces a second direction different from that of the first outer surface (A1). The light shield portion (B) is located further outside than the first light-emitting unit (H1) and the second light-emitting unit (H2).

16 Claims, 12 Drawing Sheets

(56) References Cited

U.S. PATENT DOCUMENTS

| | | | | |
|---|---|---|---|---|
| 2007/0035518 | A1 | 2/2007 | Francz | |
| 2007/0080940 | A1* | 4/2007 | Aoki | G06F 3/048 |
| | | | | 345/158 |
| 2010/0299642 | A1* | 11/2010 | Merrell | G06F 3/017 |
| | | | | 715/863 |
| 2015/0062087 | A1* | 3/2015 | Cho | G06F 3/0425 |
| | | | | 349/12 |
| 2016/0357261 | A1 | 12/2016 | Bristol | |
| 2017/0123526 | A1 | 5/2017 | Trail | |
| 2017/0131767 | A1* | 5/2017 | Long | G06F 3/0325 |
| 2017/0192495 | A1* | 7/2017 | Drinkwater | G06F 3/014 |
| 2017/0235364 | A1 | 8/2017 | Nakamura | |
| 2018/0104576 | A1* | 4/2018 | Hope | A63F 13/218 |
| 2018/0188816 | A1* | 7/2018 | Liu | A63F 13/42 |
| 2018/0190010 | A1 | 7/2018 | Sawaki | |

FOREIGN PATENT DOCUMENTS

| | | | |
|---|---|---|---|
| JP | 2009500923 | A | 1/2009 |
| JP | 2011164932 | A | 8/2011 |
| JP | 2017195515 | A | 10/2017 |
| JP | 2017213818 | A1 | 12/2017 |
| JP | 2018016493 | A | 2/2018 |
| JP | 2018106258 | A | 7/2018 |
| JP | 2019012536 | A | 1/2019 |
| JP | 2019500660 | A | 1/2019 |
| WO | 2016038953 | A1 | 3/2016 |
| WO | 2017213818 | A1 | 12/2017 |

OTHER PUBLICATIONS

International Search Report for corresponding PCT Application No. PCT/JP2020/011828, 4 pages, dated Jun. 16, 2020.

Notice of Reasons for Refusal for corresponding JP Application No. 2021-507381, 8 pages, dated Feb. 7, 2023.

Notice of Reasons for Refusal for corresponding JP Application No. 2023-127005, 5 pages, dated Jun. 13, 2024.

U.S. Appl. No. 18/787,253, "Non-Final Office Action", Aug. 18, 2025, 8 pages.

* cited by examiner

INPUT DEVICE

TECHNICAL FIELD

The present disclosure relates to an input device including a tracked unit.

BACKGROUND ART

There is a technology in which an input device is provided with a light-emitting unit so that a position and an attitude of the input device are tracked by detecting light from the light-emitting unit with a camera. JP 2011-164932A discloses an input device for game operation provided with a spherical light-emitting unit.

SUMMARY

Technical Problem

It has been discussed that a plurality of dispersed light-emitting units are provided in an input device. However, when the input device is looked at through a camera, adjacent two of the light-emitting units would overlap each other depending on an attitude of the input device, being recognized as a single light-emitting unit. This would have an influence on accuracy in tracking processing.

Solution to Problem

An input device proposed in the present disclosure includes a grip, and a tracked unit including a plurality of light-emitting units, the tracked unit extending in one direction. The tracked unit includes a first outer surface provided with a first light-emitting unit, the first outer surface extending in an extending direction of the tracked unit, a second outer surface provided with a second light-emitting unit, the second outer surface extending in the extending direction of the tracked unit, and a light shield portion. The first outer surface and the second outer surface are arranged side by side in a direction perpendicular to the extending direction of the tracked unit. The first outer surface faces a first direction. The second outer surface faces a second direction different from the first direction. The light shield portion is located further outside than the first light-emitting unit and the second light-emitting unit. By virtue of this structure, the two light-emitting units can be prevented from overlapping each other in an image obtained through a camera.

BRIEF DESCRIPTION OF DRAWINGS

FIG. 4 schematically illustrates a cross section of a tracked unit taken along a IV-IV line in FIG. 3.

FIG. 5 schematically illustrates a cross section of the tracked unit taken along a v-v line in FIG. 3.

FIG. 7 schematically illustrates a cross section of the light shield portion according to a modification example.

FIG. 8 schematically illustrates a cross section of the light shield portion according to another modification example.

DESCRIPTION OF EMBODIMENTS

Figure 2:
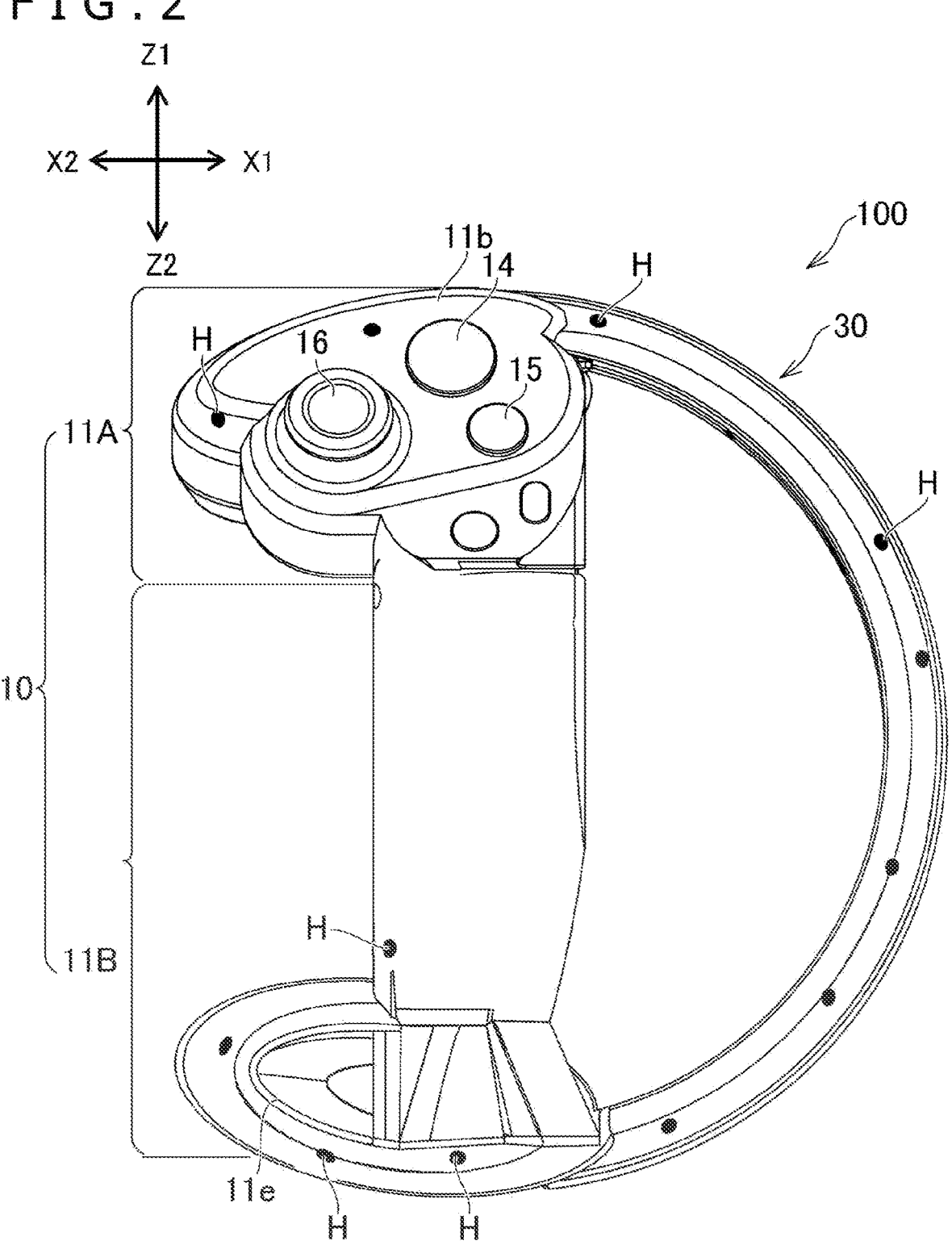
FIG. 2 is a back view of an example of the input device proposed in the present disclosure.
Figure 3:
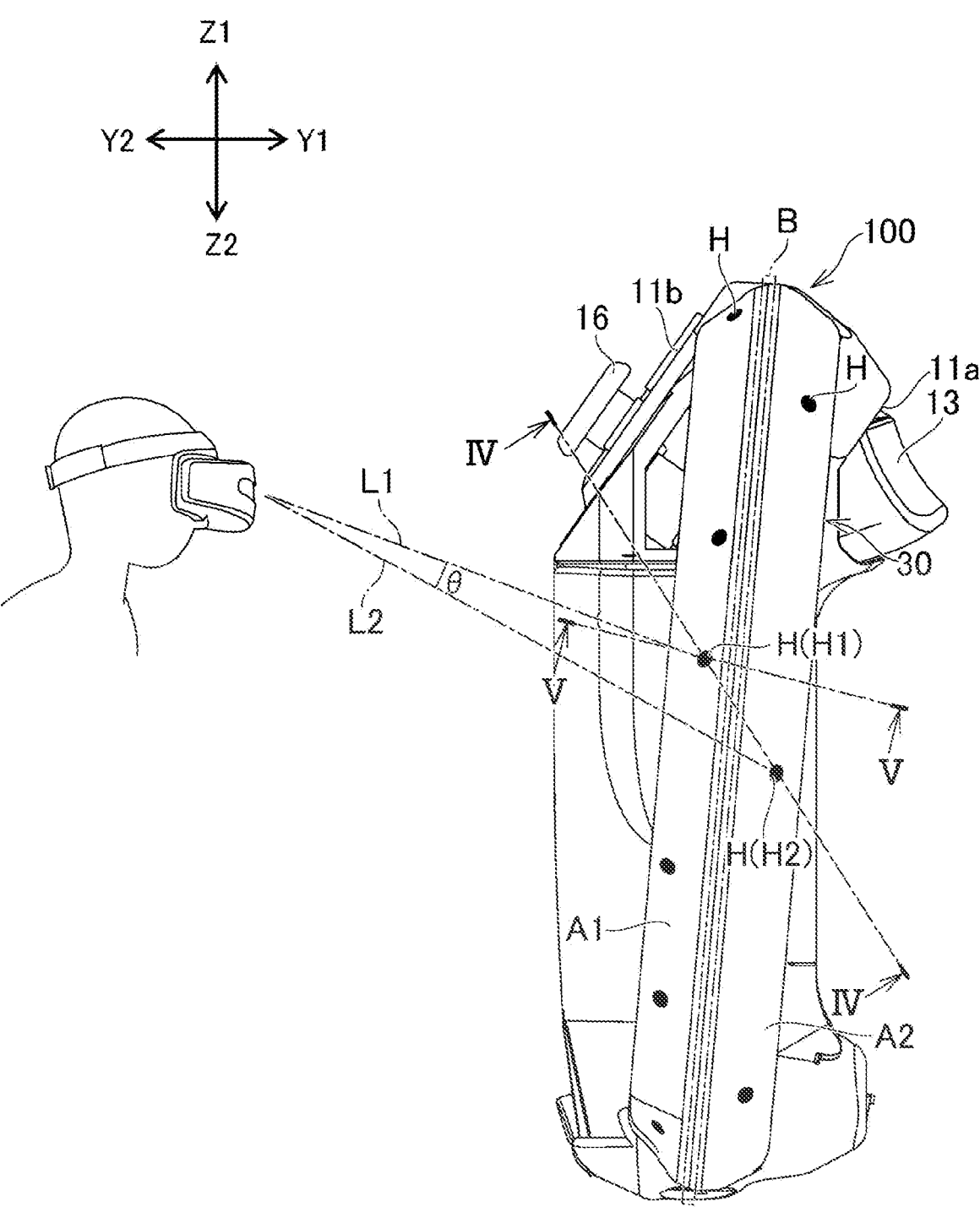
FIG. 3 is a side view of the example of the input device.

Description will be made below on an example of an input device proposed in the present disclosure. Herein, directions represented by Z1 and Z2 in FIG. 2 are respectively referred to as up and down, directions represented by X1 and X2 in FIG. 2 are respectively referred to as right and left, and directions represented by Y1 and Y2 in FIG. 3 are respectively referred to as front and rear. These directions correspond to directions of view from a user who grasps and uses an input device 100 as illustrated in FIG. 1.

Figure 1:
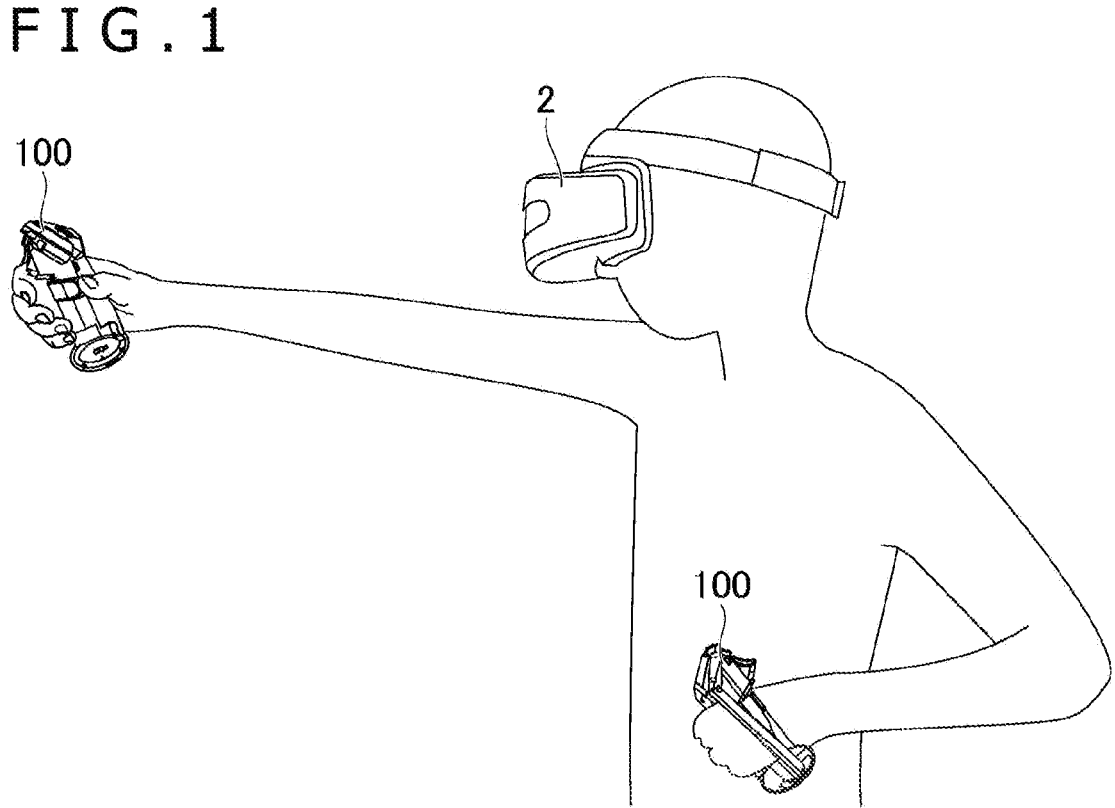
FIG. 1 is a diagram for explaining an example of a system in which an input device proposed in the present disclosure is used.

[Outline of System] As illustrated in FIG. 1, the input device 100 is used with, for example, a head mounted display (HMD) 2. The user wears the HMD 2 on his or her head and holds the input device 100 in his or her right hand and/or left hand. The HMD 2 includes a camera facing forward. The input device 100 is provided with a plurality of light-emitting units H described later. Positions of the light-emitting units H are detected through the camera and a position and an attitude of the input device 100 (i.e., a position and an orientation of the hand of the user) are calculated on the basis of the positions of the light-emitting units. The input device 100 includes a plurality of operation units (for example, an operation button, an operation stick, and a touch sensor) for the user to operate with a finger as described later. A display of the HMD 2 shows a moving image (for example, a game image) generated on the basis of the position of the input device 100, the attitude thereof, an operation performed on the operation units, etc.

The position and attitude of the input device 100 may be calculated by an information processing device installed in the HMD 2 or by an external information processing device (for example, a game device independent of the HMD 2 or a personal computer). The input device 100 may include a motion sensor (for example, an acceleration sensor or a gyroscope sensor). The information processing device may calculate the position and attitude of the input device 100 on the basis of not only the positions of the light-emitting units H but also an output from the motion sensor. Further, the moving image may be generated by the information processing device installed in the HMD 2 or by the external information processing device. In a case where the external information processing device calculates the position of the input device 100, etc. and generates the moving image, image information obtained by the camera of the HMD 2 is sent to the external information processing device wirelessly or by wire. Moving image information generated by the external information processing device is sent to the HMD 2 wirelessly or by wire.

It should be noted that the input device 100 may be used independently of the HMD 2 not as in the system illustrated as an example in FIG. 1. In this case, the camera for tracking the position and attitude of the input device 100 is not necessarily provided in the HMD 2 and may be disposed at a position distant forward from the user. For example, the camera may be attached to an external display device (for example, a monitor of a television or a personal computer)

for displaying the moving image generated on the basis of the position and attitude of the input device 100.

[Overall Configuration of Input Device] An outline of the input device 100 for a right hand and an outline of the input device 100 for a left hand may be bilaterally symmetric. A detailed description will be made below on the input device 100 for a right hand.

As illustrated in FIG. 2, a body 10 of the input device 100 includes a grip 11B and an operation region 11A where the plurality of operation units are disposed. The body 10 has the operation region 11A in an upper portion thereof, and the grip 11B extends downward from the operation region 11A. The operation units disposed in the operation region 11A are able to be operated with a thumb or an index finger with the grip 11B grasped. The grip 11B is held with, for example, a ball of the thumb, a middle finger, a ring finger, and a little finger.

As illustrated in FIG. 2 and FIG. 3, for example, operation buttons 13, 14, and 15 and an operation stick 16 are disposed as the operation units in the operation region 11A. The operation button 13 is disposed on a front surface 11a of the operation region 11A (see FIG. 3) and is to be operated with, for example, the index finger. The operation buttons 14 and 15 and the operation stick 16 are disposed on a back surface 11b of the operation region 11A (see FIG. 2) and are to be operated with, for example, the thumb. The operation stick 16 is an operation unit that is tiltable in a radial direction and slidable. The operation units provided in the operation region 11A are not limited to the example described herein. For example, a touch sensor, a trigger button, a touch-sensor-equipped button may be provided in the operation region 11A. Further, the number of the operation units provided in the operation region 11A may be one, two, or four or more.

As illustrated in FIG. 2, the input device 100 includes a tracked unit 30 in which the plurality of light-emitting units H are disposed (in the figure, the light-emitting units are illustrated as filled circles). In the example illustrated in the figure, the tracked unit 30 is located on a right side of the body 10, being coupled to an uppermost portion of the body 10 and a lowermost portion of the body 10. The tracked unit 30 extends downward from the uppermost portion of the body 10 while curved to project outward in a right-and-left direction.

The tracked unit 30 is not limited in position and shape to the example illustrated in the figure as long as being at a position for the light-emitting units H to be stably detected by the camera installed in the HMD 2. For example, the tracked unit 30 may be located on a left side of the body 10 or may be located on an upper side, a lower side, a rear side, or a front side of the body 10. Further, the shape of the tracked unit 30 may be, instead of a curved bar-shape, a bar-shape extending straight or an annular shape. In a case where the shape of the tracked unit 30 is an annular shape, the tracked unit 30 may be disposed such that it surrounds a hand or a wrist of the user who grasps the grip 11B.

Another light-emitting unit H may be provided also in the body 10. For example, another plurality of light-emitting units H may be provided in the front surface 11a or the back surface 11b of the operation region 11A or another plurality of light-emitting units H may be provided in a lower portion 11e of the grip 11B as illustrated in FIG. 2.

[Tracked Unit] A detailed description will be made below on a structure of the tracked unit 30. Directions referred to in the description below are used to explain relative positional relations among elements (components, members, and portions) of the tracked unit 30 and are not intended to limit the position of the tracked unit 30 in the input device 100.

Figure 4:
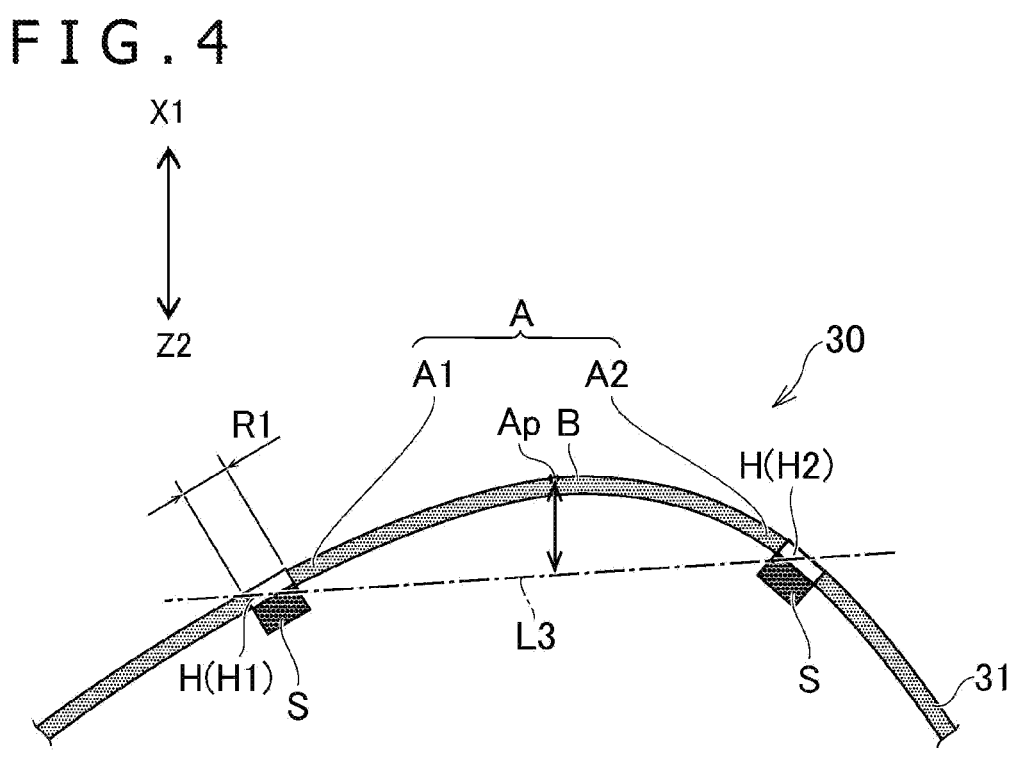

As illustrated in FIG. 4, the tracked unit 30 includes an exterior member 31 that provides an outer surface A of the tracked unit 30 and a plurality of light sources S disposed inside the exterior member 31. For example, a light-emitting diode (LED) is usable as each of the light sources S. For example, the light sources S are disposed inside the exterior member 31 along the exterior member 31. In this case, positions of the plurality of light sources S correspond one-to-one to the positions of the light-emitting units H. For example, the light sources S are mounted on a flexible printed circuit board (FPC) supported by a frame not illustrated. The exterior member 31 is formed of, for example, an opaque material. The exterior member 31 itself may be formed of an opaque material, or a surface of the exterior member 31 is coated with a material that lets no light through. In a case where the exterior member 31 is formed of an opaque material, the exterior member 31 is formed of a material that lets light through only at the positions of the light-emitting units H. The exterior member 31 may be provided with holes which let light through, at the positions of the light-emitting units H.

As illustrated in FIG. 4, the outer surface A includes a first outer surface A1 and a second outer surface A2. The two outer surfaces A1 and A2 extend in an extending direction of the tracked unit 30 and are arranged side by side in a direction perpendicular to the extending direction. In the example of the input device 100, the tracked unit 30 is curved, extending in an up-and-down direction and projecting rightward (see FIG. 2). The two outer surfaces A1 and A2 are thus curved, extending in the up-and-down direction and projecting rightward as illustrated in FIG. 3. The outer surfaces A1 and A2 are formed adjacent to each other in a front-and-rear direction and are continuous with each other. In the example of the input device 100, the outer surface A is gently curved from the first outer surface A1 to the second outer surface A2. The outer surface A may be bent between the two outer surfaces A1 and A2 with an angle made therebetween. As illustrated in FIG. 3, the two outer surfaces A1 and A2 are each provided with the plurality of light-emitting units H. In each of the outer surfaces A1 and A2, the plurality of light-emitting units H are arranged side by side in the extending direction of the tracked unit 30.

A facing direction of the first outer surface A1 (a direction of a normal line D1 in FIG. 5) and a facing direction of the second outer surface A2 (a direction of a normal line D2 in FIG. 5) are different from each other. In the example of the input device 100, the outer surface A1 faces rearward and rightward and the outer surface A2 faces forward and rightward (in FIG. 5, X1, Y1, and Y2 represent rightward, forward, and rearward with respect to the input device 100, respectively) in a cross section taken along a plane perpendicular to the extending direction of the tracked unit 30 (for example, a horizontal plane).

[Light Shield Portion] As illustrated in FIG. 3, when the input device 100 is looked at through the camera installed in the HMD 2, there is an angle θ, which is determined by a relative position between the input device 100 and the camera, made between a straight line L1 connecting the light-emitting unit H in the first outer surface A1 and the camera and a straight line L2 connecting the light-emitting unit H in the second outer surface A2 and the camera. The angle θ becomes smaller depending on the relative position between the input device 100 and the camera, which would cause the two light-emitting units H to overlap each other in an image captured by the camera. This has an influence on tracking accuracy (accuracy in calculation of the position and attitude) of the input device 100.

Accordingly, in the example of the input device 100, a light shield portion B is provided in the tracked unit 30 as illustrated in FIG. 4. The light shield portion B, which is a part of the exterior member 31, is located between a light-emitting unit H1 in the first outer surface A1 and a light-emitting unit H2 in the second outer surface A2. (The light-emitting units H1 and H2 are, among the plurality of light-emitting units H in the first outer surface A1 and the plurality of light-emitting units H in the second outer surface A2, respective two light-emitting units H that are least distant from each other.) The light shield portion B is a portion located further outside than the two light-emitting units H1 and H2. In other words, the light shield portion B is a portion located further outside than a straight line L3 connecting the two light-emitting units H1 and H2. In the example of the input device 100, the light shield portion B is located on a right side with respect to the straight line L3. Such a light shield portion B allows for preventing the two light-emitting units H1 and H2 from overlapping each other in an image captured by the camera. As in the example illustrated in FIG. 4, a distance D from an apex portion Ap of the light shield portion B to the line L3 may be larger than a diameter R1 of the light-emitting units H. The distance D from the apex portion Ap of the light shield portion B to the line L3 may be 1.5 times or more as large as the diameter R1 of the light-emitting units H.

Figure 5:
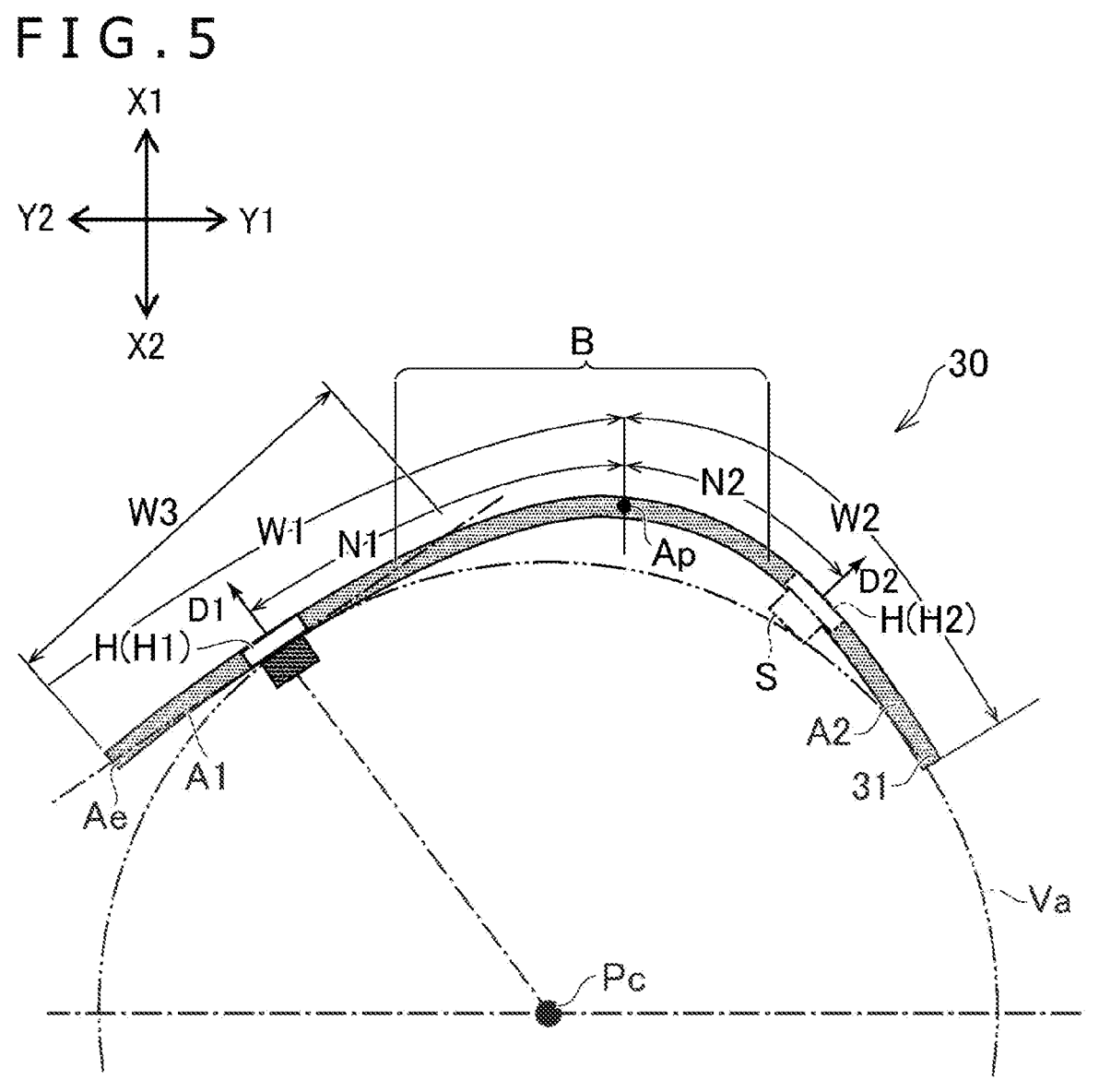

It is desirable that, when viewed in a cross section taken along a plane perpendicular to the extending direction of the tracked unit 30, the light shield portion B include a portion located further outside than a virtual arc Va that is in contact with the first outer surface A1 and the second outer surface A2 as illustrated in FIG. 5. The arc Va is, for example, an arc that is in contact with the first outer surface A1 at a position of the light-emitting unit H1 of the first outer surface A1 and in contact with the second outer surface A2. In a case where a width W2 of the second outer surface A2 is smaller, the arc Va may be, for example, an arc that is in contact with the first outer surface A1 at the position of the light-emitting unit H1 of the first outer surface A1 and in contact with a virtual plane including the second outer surface A2. The arc Va is a part of a true circle having a center Pc. It should be noted that, in the example of the input device 100, a distance N1 from the apex portion Ap of the outer surface A to the light-emitting unit H1 is larger than a distance N2 from the apex portion Ap of the outer surface A to the light-emitting unit H2 as described later. The above-described arc Va is an arc defined by, out of the two light-emitting units H1 and H2, the light-emitting unit H1 with a larger distance.

Figure 6:
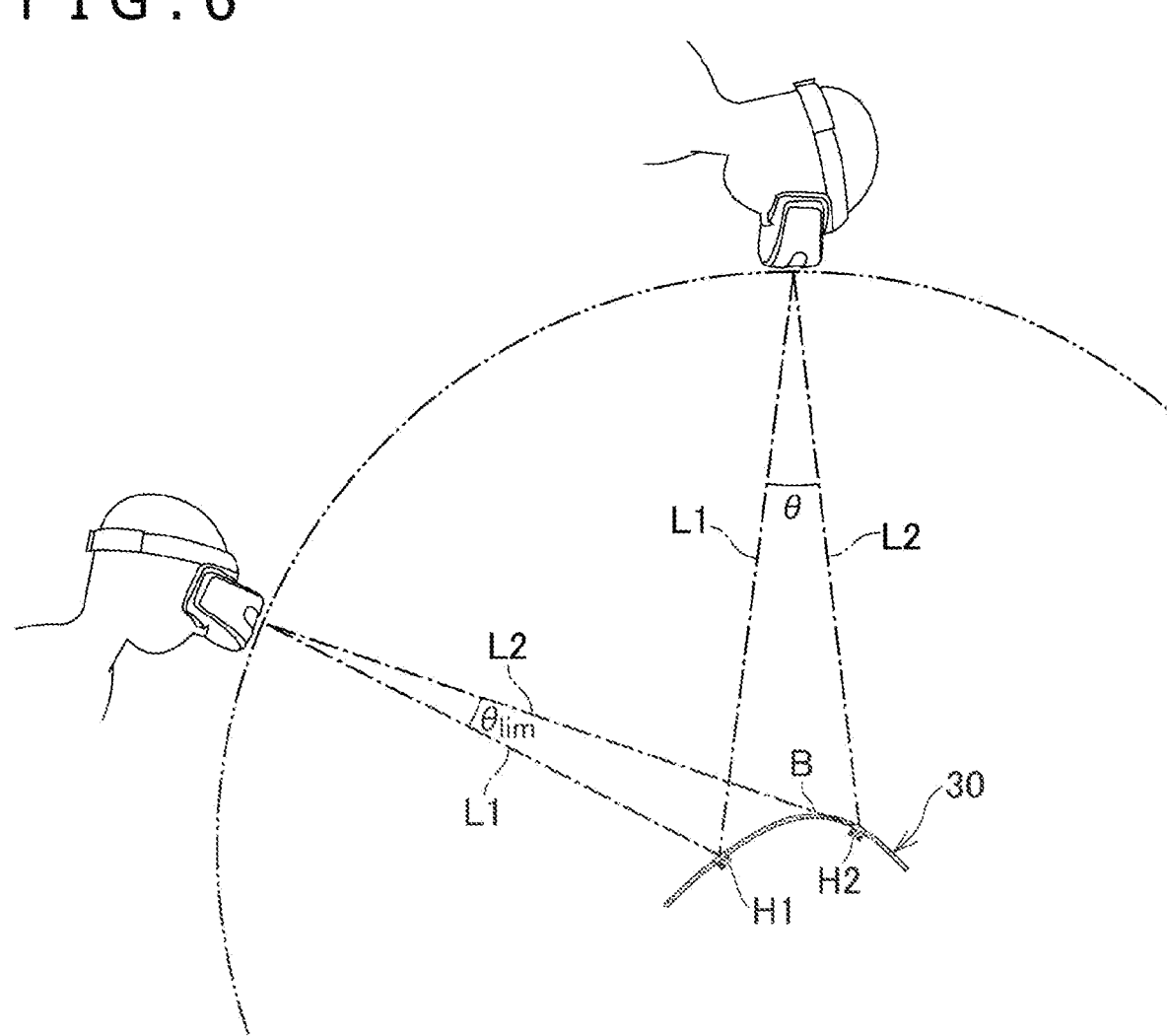
FIG. 6 is a diagram for explaining a function of a light shield portion.

By virtue of the presence of such a light shield portion B, it is possible to effectively prevent the two light-emitting units H1 and H2 from overlapping each other in an image captured by the camera. For example, as illustrated in FIG. 6, in a case where the angle θ between the straight line L1, which connects the light-emitting unit H1 and the camera, and the straight line L2, which connects the light-emitting unit H2 and the camera, becomes θlim due to the camera being located on a rear side of the input device 100, the straight line L2 intersects with the light shield portion B, causing the light-emitting unit H2 not to be seen in an image captured by the camera.

As illustrated in FIG. 3, the light shield portion B extends in the extending direction of the tracked unit 30. It is desirable that the light shield portion B be formed across a whole region where the light-emitting units H are provided in the tracked unit 30. A position of the light shield portion B is not limited to the example of the input device 100. For example, the light shield portion B may be intermittently formed in the extending direction of the tracked unit 30. For example, while the light shield portion B is formed for two of the light-emitting units H with a small distance therebetween (the light-emitting unit H of the first outer surface A1 and the light-emitting unit H of the second outer surface A2), the light shield portion B is not necessarily formed between two of the light-emitting units H with a large distance therebetween (another light-emitting unit H of the first outer surface A1 and another light-emitting unit H of the second outer surface A2).

It should be noted that the "outer surface A" herein, which refers to a surface provided by a member in an outermost surface of the tracked unit 30, is provided by an opaque exterior member or a transparent exterior member. The "light-emitting unit H" refers to a portion of the exterior member that lets light through. For example, as illustrated in FIG. 4 and FIG. 5, in a structure in which the exterior member 31 is formed of an opaque material and a material or holes that let light through are formed at positions of the light sources S, portions where the material that lets light through is formed or portions where the holes that let light through are formed are the light-emitting units H. In contrast, in a later-described structure in which a transparent exterior member is disposed in the outermost surface of the tracked unit 30 and the light sources S are disposed inside the exterior member (see FIG. 7), portions facing the light sources S are the light-emitting units H. Alternatively, in a later-described structure in which a transparent exterior member is disposed in the outermost surface of the tracked unit 30, light guide members are disposed inside the exterior member, and light from the light sources S is to be guided by the light guide members (see FIG. 8 and FIG. 9), portions facing end surfaces (light outgoing surfaces) of the light guide members are the light-emitting units H. A direction of an optical axis of each of the light-emitting units H is substantially the same as the facing directions of the outer surfaces A1 and A2.

As illustrated in FIG. 5, the light shield portion B is formed as, for example, a part of the opaque exterior member 31. This structure allows for ensuring the light shield portion B without the necessity of increasing the number of components. In the example of the input device 100, a part of the outer surface A including a boundary between the first outer surface A1 and the second outer surface A2 functions as the light shield portion B. In more detail, a ridge (in other words, a corner) is formed between the first outer surface A1 and the second outer surface A2 continuous therewith, and the ridge functions as the light shield portion B. It should be noted that, instead of the ridge being caused to function as the light shield portion B, for example, the exterior member 31 may have a rib (wall) formed integrally with the exterior member 31 between the first outer surface A1 and the second outer surface A2, the rib functioning as the light shield portion B.

In still another example, the light shield portion B may be a member formed independent of the exterior member 31. For example, the light shield portion B may be formed of a material such as sponge, silicone, rubber, or plastic independent of the exterior member 31 and attached to the exterior member 31 or a frame of the tracked unit 30.

Further, in the example of the input device 100, the first outer surface A1 is located on a rear side with respect to the second outer surface A2 as illustrated in FIG. 3. This causes the first outer surface A1 to be, when the user holds the input device 100, a surface closer to the camera than the second outer surface A2, i.e., a surface closer to a body of the user. The first outer surface A1 is thus more likely to appear in an image captured by the camera than the second outer surface A2. As illustrated in FIG. 5, when a cross section perpendicular to the extending direction of the tracked unit 30 is viewed, a width W1 of the first outer surface A1 is larger than the width W2 of the second outer surface A2. This means that, in the example of the input device 100, the width W1 of the first outer surface A1, which is closer to the camera, is larger than the width W2 of the second outer surface A2, which is more distant from the camera. This structure allows for increasing flexibility in the positions and number of the light-emitting units H provided in the first outer surface A1. As a result, an improvement in tracking accuracy is facilitated as compared with a case where the width W2 of the second outer surface A2 is larger than the width W1 of the first outer surface A1.

Further, as illustrated in FIG. 5, when a cross section perpendicular to the extending direction of the tracked unit 30 is viewed, the distance N1 from the apex portion Ap between the first outer surface A1 and the second outer surface A2 to the light-emitting unit H1 is larger than the distance N2 from the apex portion Ap to the light-emitting unit H2. (The apex portion Ap refers to a portion having a largest curvature in the outer surface A of the tracked unit 30 when the cross section of the tracked unit 30 is viewed.) This relation in distance may be satisfied by another light-emitting unit H provided in the first outer surface A1 and another light-emitting unit H provided in the second outer surface A2. This structure of the tracked unit 30 increases, in an image captured by the camera, a background formed in the vicinity of the light-emitting unit H1 of the first outer surface A1. For example, it is possible to prevent a pattern or illumination light of a room where the input device 100 is used from appearing immediately near the light-emitting unit H1 in an image captured by the camera. As a result, the light-emitting unit H1 is likely to be correctly recognized through the camera to improve the tracking accuracy.

It is desirable that the light-emitting units H be located within, within a range of the width W1 in a front-and-rear direction of the first outer surface A1, a range W3 corresponding to two-thirds of the width W1 from a rear end Ae of the first outer surface A1. In other words, it is desirable that the light-emitting units H be located within the range W3 corresponding to two-thirds of the width W1 from the end portion Ae in a direction toward the camera. It is more desirable that the light-emitting units H be located within a range corresponding to one-half of the width W1 from the end portion Ae in the direction toward the camera.

As illustrated in FIG. 3, the first outer surface A1 is provided with the plurality of light-emitting units H arranged side by side in the extending direction of the tracked unit 30 and the second outer surface A2 is likewise provided with the plurality of second light-emitting units H arranged side by side in the extending direction. This allows for improving the tracking accuracy. In the example of the input device 100, the number of the light-emitting units H provided in the first outer surface A1 is larger than the number of the light-emitting units H in the second outer surface A2. This means that the number of the light-emitting units H that are likely to appear in an image captured by the camera is larger.

Further, as illustrated in FIG. 3, the positions of the light-emitting units H in the first outer surface A1 and the positions of the light-emitting units H in the second outer surface A2 are offset from each other in the extending direction of the tracked unit 30 (in the up-and-down direction in the example of the input device 100). This ensures a sufficient distance between the light-emitting units H in the first outer surface A1 and the light-emitting units H in the second outer surface A2, which also results in making the angle θ between the straight line L1, which connects the light-emitting unit H in the first outer surface A1 and the camera, and the straight line L2, which connects the light-emitting unit H in the second outer surface A2 and the camera, likely to be sufficiently ensured.

Figure 7:
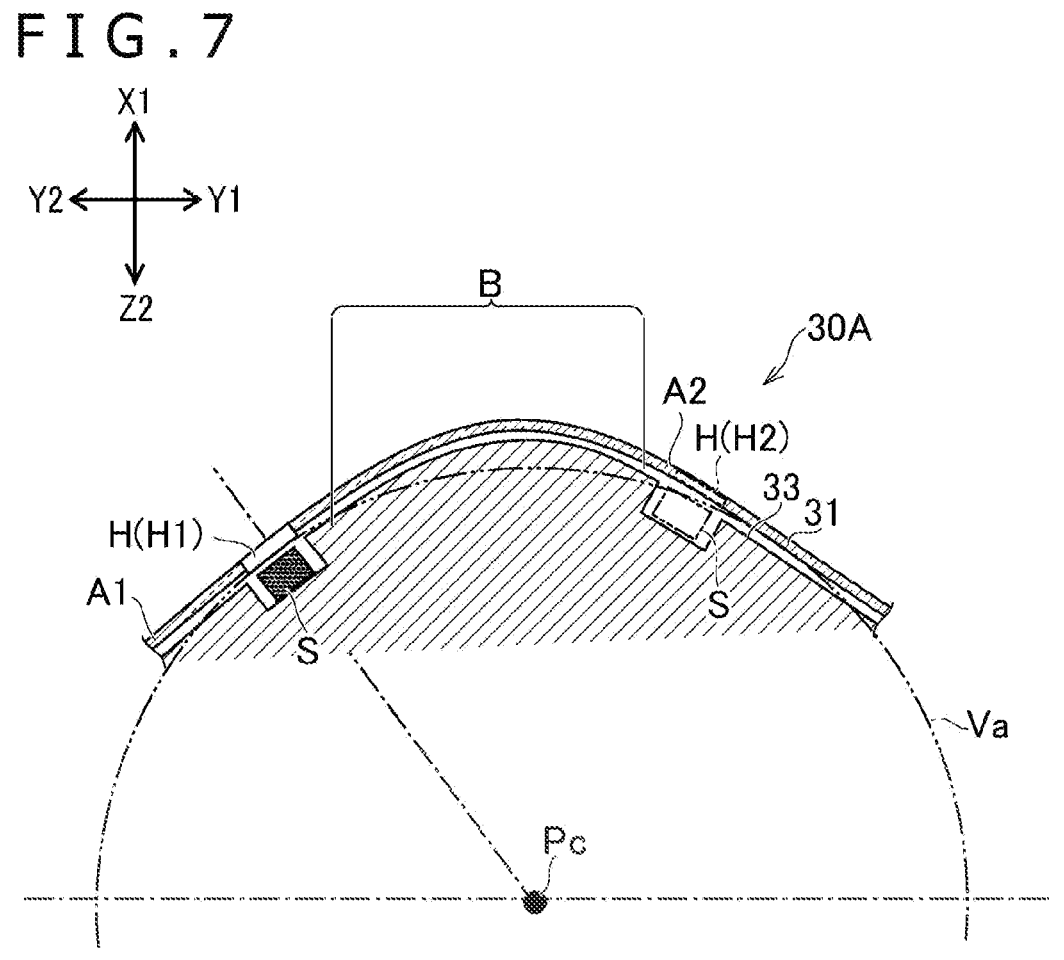
Figure 8:
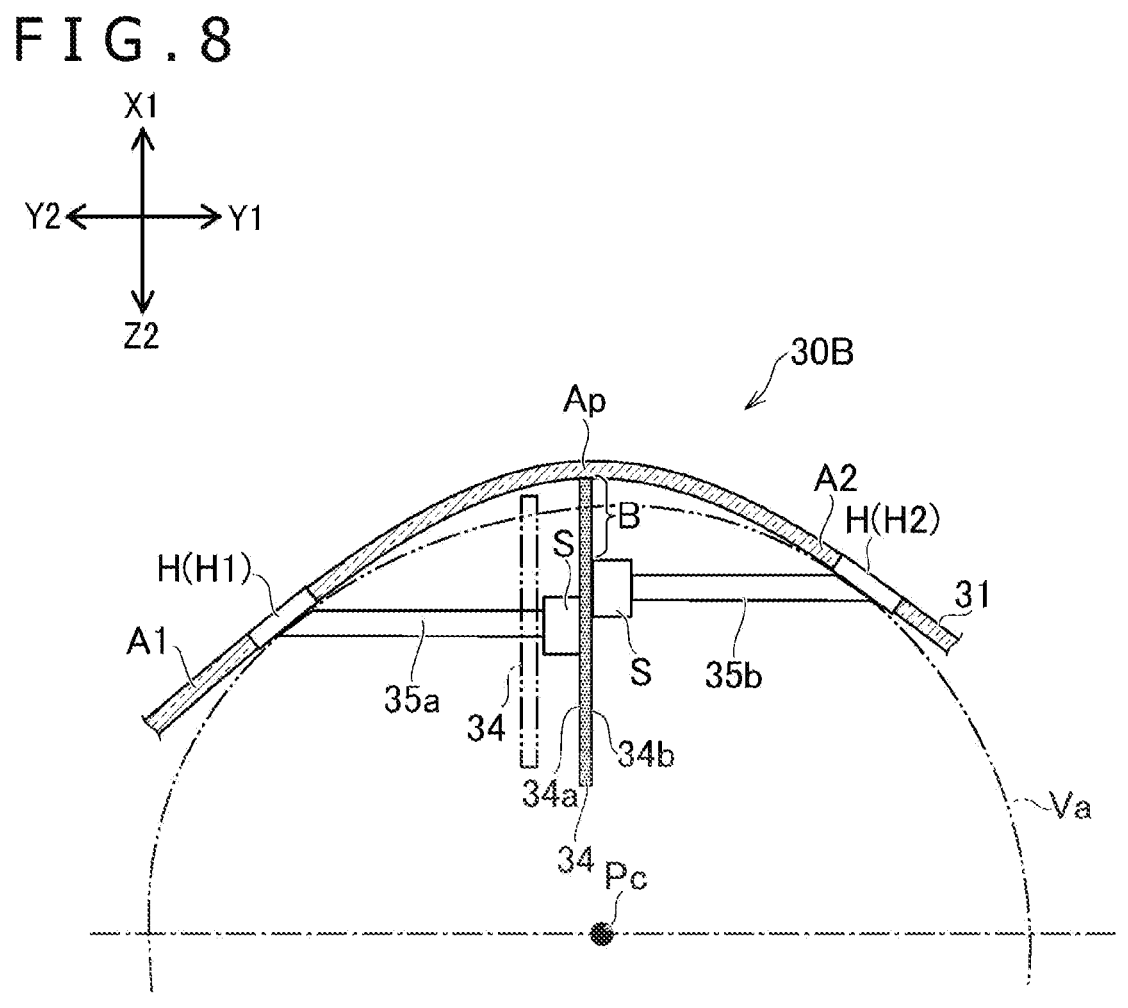
Figure 9:
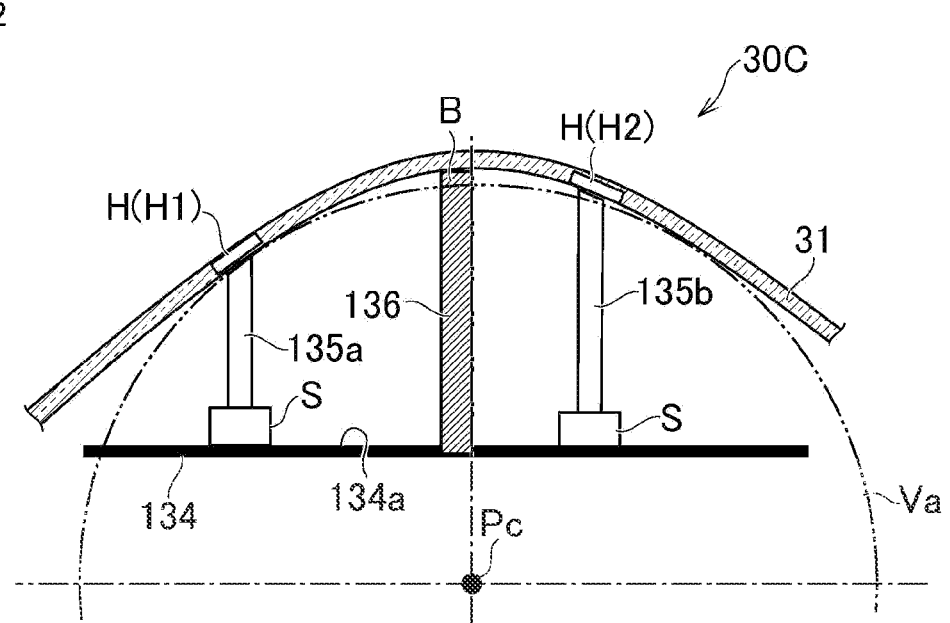
FIG. 9 schematically illustrates a cross section of the light shield portion according to still another modification example.

[Other Examples of Tracked Unit] The light shield portion B may be provided by a member different from the exterior member 31. FIG. 7 to FIG. 9 are diagrams for explaining modification examples of the tracked unit 30. In these figures, the same reference signs as those for the sections described so far are used.

In an example illustrated in FIG. 7, a tracked unit 30A includes a frame 33 disposed inside the exterior member 31 and supporting the light sources S. With the light sources S mounted on a substrate, which is not illustrated, the substrate may be attached to the frame 33. The exterior member 31 is formed of a transparent material. In this case, a part of the frame 33 may serve as the light shield portion B. The light shield portion B is likewise located outside the virtual arc Va. This structure allows the frame 33, which supports the light sources S, to function as the light shield portion B to reduce an increase in the number of components.

In an example illustrated in FIG. 8, a tracked unit 30B includes a substrate 34 disposed along an extending direction of the tracked unit 30B and light guide members 35a and 35b. The light sources S are mounted on both surfaces (first substrate surface 34a and second substrate surface 34b) of the substrate 34. The substrate 34 is, for example, a rigid substrate. The substrate 34 is disposed with the first substrate surface 34a facing the first outer surface A1 and the second substrate surface 34b facing the second outer surface A2. Light from the light source S mounted on the first substrate surface 34a is guided through the light guide member 35a to the light-emitting unit H1 in the first outer surface A1, and light from the light source S mounted on the second substrate surface 34a is guided through the light guide member 35b to the light-emitting unit H2 in the second outer surface A2. The exterior member 31 is formed of a transparent material. In this structure, a part of the substrate 34 may function as the light shield portion B. The light shield portion B is likewise located outside the virtual arc Va.

In the example illustrated in FIG. 8, the substrate 34 is disposed along the apex portion Ap of the outer surface A. That is, a position of the substrate 34 in the front-and-rear direction corresponds to a position of the apex portion Ap. However, the substrate 34 may be offset rearward (a Y2 direction) from the position of the apex portion Ap as illustrated by a chain double-dashed line in the figure or, inversely, may be offset forward (a Y1 direction).

In an example illustrated in FIG. 9, a tracked unit 30C includes a substrate 134 disposed along an extending direction of the tracked unit 30C, light guide members 135a and 135b, and a wall member 136. The light sources S are mounted only on one surface, a substrate surface 134a, of the substrate 134. The substrate 134 is disposed with the substrate surface 134a facing the first outer surface A1 and the second outer surface A2. Light from the two light sources S mounted on the substrate surface 134a is guided through the light guide members 135a and 135b to the light-emitting unit H1 in the first outer surface A1 and the light-emitting unit H2 in the second outer surface A2, respectively. The exterior member 31 is formed of a material that is transparent or that lets light through. The wall member 136 is disposed upright with respect to the substrate 134 and has a part that functions as the light shield portion B. The light shield portion B is likewise located outside the virtual arc Va.

Figure 10A:
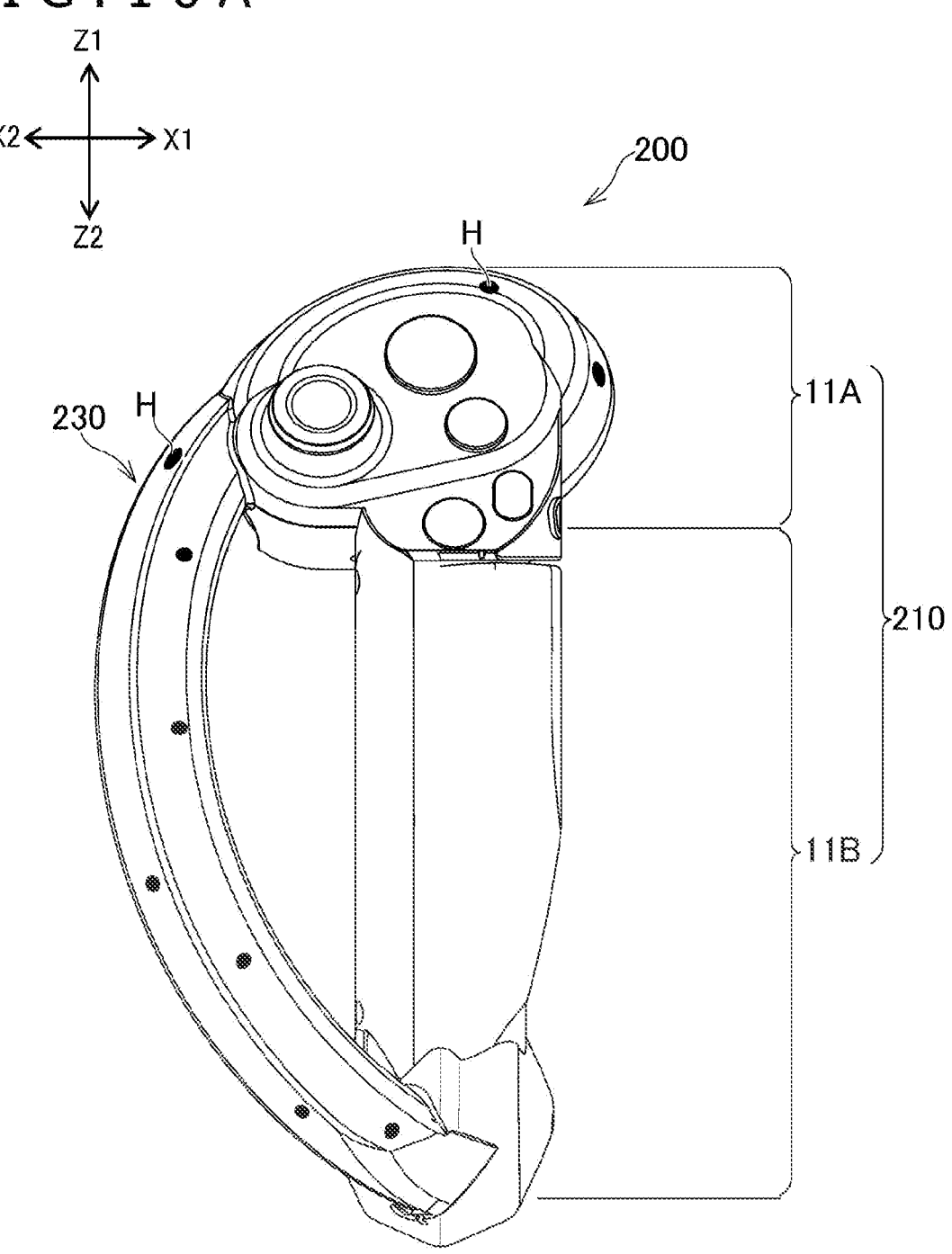
FIG. 10A is a back view of another example of the input device proposed in the present disclosure.
Figure 10B:
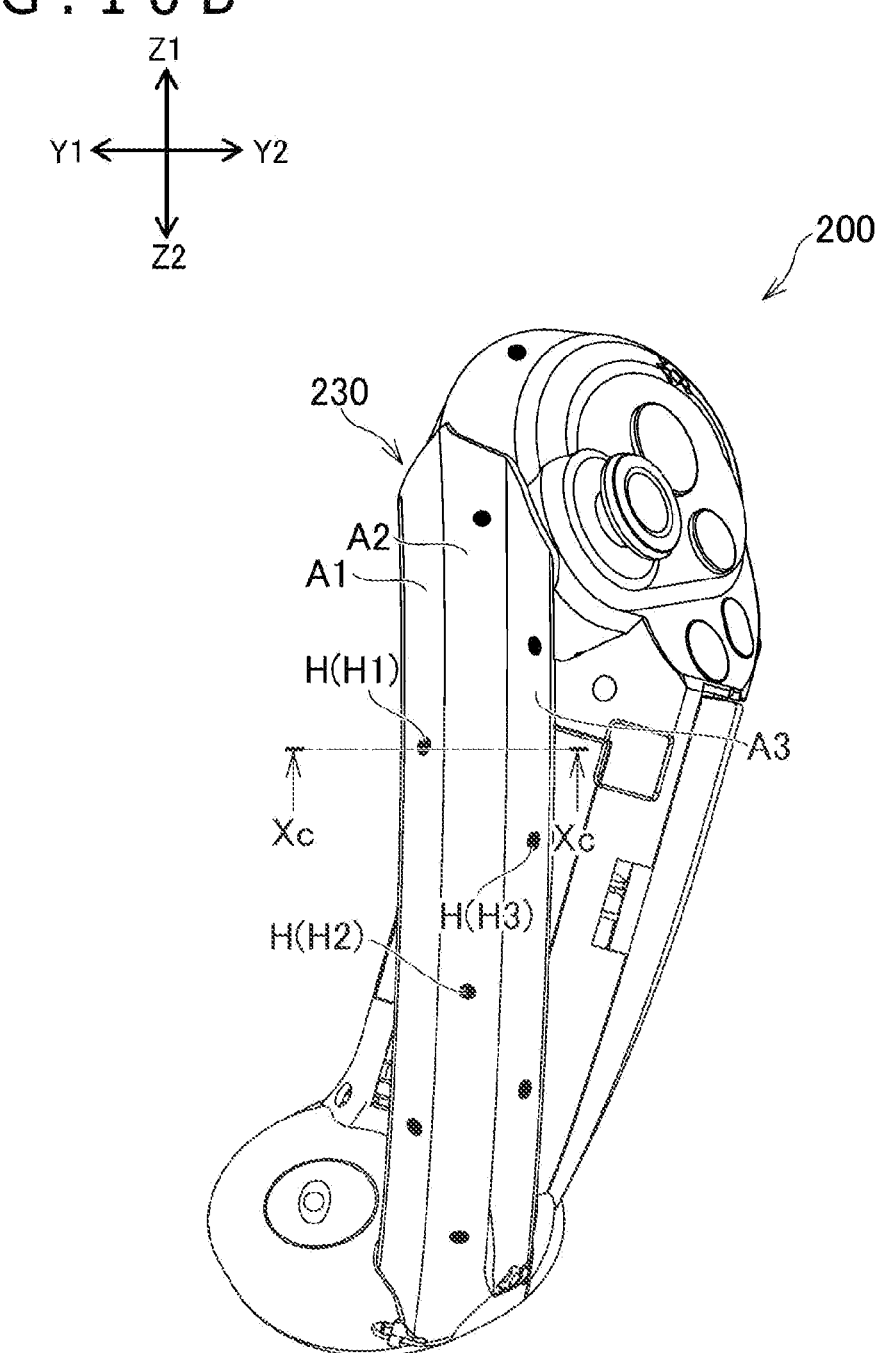
FIG. 10B is a side view of the example of the input device illustrated in FIG. 10A.
Figure 10C:
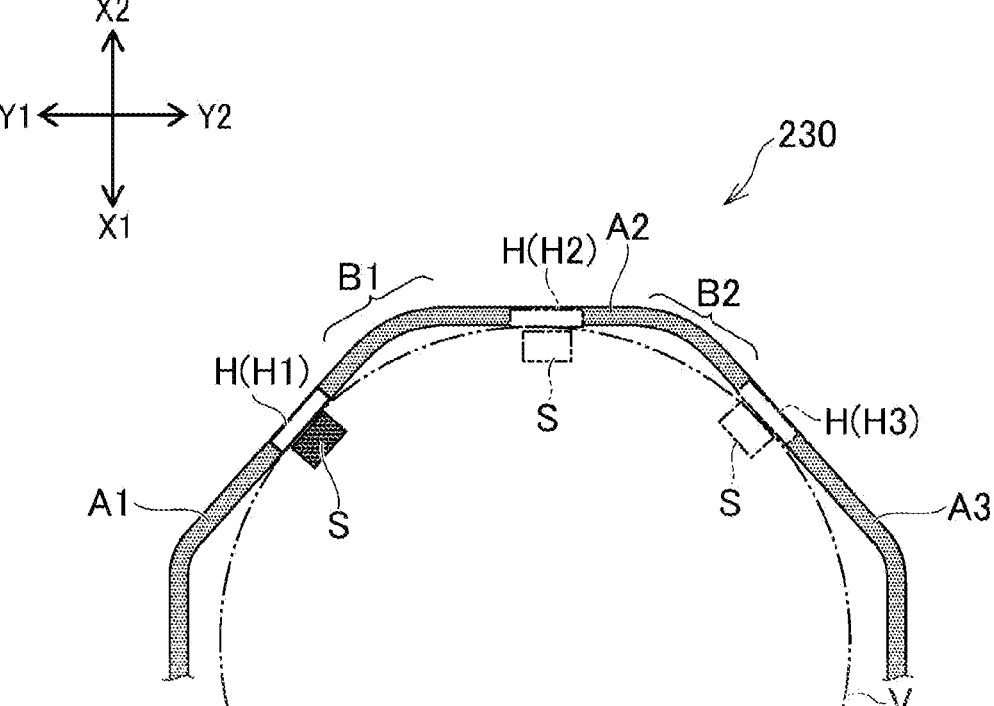
FIG. 10C schematically illustrates a cross section of the tracked unit taken along an Xc-Xc line in FIG. 10B.

[Other Examples of Input Device] In an input device 200 illustrated in FIG. 10A to FIG. 10C, a tracked unit 230 is located on a left side of a body 210. The tracked unit 230 has the first outer surface A1, the second outer surface A2, and a third outer surface A3, which extend in an extending direction of the tracked unit 230. The three outer surfaces A1, A2, and A3 are arranged side by side in a direction perpendicular to the extending direction of the tracked unit 230 (in the example of the input device 200, the front-and-rear direction). The light-emitting units H are provided in the outer surfaces A1, A2, and A3.

As illustrated in FIG. 10C, a light shield portion B1 is located between the light-emitting unit H1 in the first outer surface A1 and the light-emitting unit H2 in the second outer surface A2. A light shield portion B2 is located between the light-emitting unit H2 in the second outer surface A2 and a light-emitting unit H3 in the third outer surface A3. The light shield portion B1 has a portion located further outside than the two light-emitting units H1 and H2, and the light shield portion B2 has a portion located further outside than the two light-emitting units H2 and H3.

Further, a relation between the light-emitting units H1 and H2, the outer surfaces A1 and A2, and the light shield portion B1 illustrated in FIG. 10C may be the same as the relation between the light-emitting units H1 and H2 and the light shield portion B described with reference to FIG. 5. A relation between the light-emitting units H2 and H3, the outer surfaces A2 and A3, and the light shield portion B2 illustrated in FIG. 10C may be the same as the relation between the light-emitting units H1 and H2 and the light shield portion B described with reference to FIG. 5. That is, it is desirable that the light shield portion B1 have a portion located further outside than the virtual arc Va that is in contact with the first outer surface A1 and the second outer surface A2. Likewise, it is desirable that the light shield portion B2 also have a portion located further outside than the virtual arc Va that is in contact with the second outer surface A2 and the third outer surface A3. (The arc that is in contact with the two outer surfaces A1 and A2 and the arc that is in contact with the two outer surfaces A2 and A3 are not necessarily the same.) This is the description on the input device 200 illustrated in FIG. 10A to FIG. 10C.

In still another example, the shape of the tracked unit 30 may be an annular shape. In this case, the two outer surfaces A1 and A2 extend in a circumferential direction and are arranged side by side in a direction vertical to the circumferential direction (a direction along a center line of the annular tracked unit 30). Further, the light shield portion B, which likewise extends in the circumferential direction, is formed between the adjacent two outer surfaces A1 and A2.

In the example of the input device 100, the light shield portion B is formed across the whole region where the light-emitting units H are provided in the tracked unit 30. However, the light shield portion B may be provided only between one of the light-emitting units H provided in the first outer surface A1 and one of the light-emitting units H provided in the second outer surface A2.

In yet another example, the input device 100 does not necessarily include the operation units that are to be operated with a finger, such as the operation buttons 13, 14, and 15 and the operation stick 16. Even in this case, the user may be able to reflect, by moving the input device 100 with the grip 11B held, the motion in a moving image displayed on the HMD 2.

As described above, the camera for tracking the position and attitude of the input device 100 is not necessarily provided in the HMD 2 and may be disposed at a position distant forward from the user. For example, the camera may be attached to an external display device (for example, a monitor of a television or a personal computer) for displaying the moving image generated based on the position and attitude of the input device 100.

Further, a type of the camera for tracking the position and attitude of the input device 100 is not limited. The camera may include an image sensor that detects visible light or may be an infrared image sensor. Alternatively, the camera may be equipped with a sensor (Dynamic vision sensor, Event Driven Sensor, or the like) that outputs only information regarding, within a whole angle of view, a pixel that has undergone a change.

The invention claimed is:

1. An input device comprising:
   a main body, including: (i) a grip having comprising a first end, a second end that is opposite to the first end, wherein the grip comprises and a light-emitting unit; (ii) an operation region disposed proximate to the first end of the grip of the main body, and including a plurality of operation units for manipulation by a user's fingers while holding the grip; and
   a tracked unit including:
      a plurality of light-emitting units;
      a curved member extending from a first position proximate to the operation region at the first end of the grip to a second position at the second end of the grip;
      a first outer surface provided with a first light-emitting unit disposed along the tracked unit between the first position and the second position, the first outer surface extending in an extending direction of the tracked unit;
      a second outer surface provided with a second light-emitting unit disposed along the tracked unit between the first position and the second position, the second outer surface extending in the extending direction of the tracked unit; and
      a light shield portion having an outward facing surface and an opposing inward facing surface, and including an outwardly curved section located between the first light-emitting unit and the second light-emitting unit, which are adjacent to one another, wherein:
   the first outer surface and the second outer surface are arranged side by side such that respective normal directions thereof are substantially perpendicular to one another and substantially transverse to the extending direction of the tracked unit,
   the first light-emitting unit faces a first direction corresponding to the respective normal direction of the of the first outer surface, the second light-emitting unit faces a second direction corresponding to the respective normal direction of the of the second outer surface, and the first direction and the second direction are substantially orthogonal to one another, and
   a distance from an apex portion of the light shield portion to a line extending between the first light-emitting unit and the second light-emitting unit is greater than a diameter of at least one of the first light-emitting unit and the second light-emitting unit.

2. The input device according to claim 1, wherein the light shield portion includes a portion located further outside than an arc that is in contact with the first outer surface and the second outer surface.

3. The input device according to claim 1, wherein the light shield portion includes a portion located at a position outside a virtual arc that is in contact with the first outer surface at a position of the first light-emitting unit and in contact with the second outer surface or a plane including the second outer surface.

4. The input device according to claim 1, wherein
the first outer surface is provided with a plurality of first light-emitting units arranged side by side in the extending direction of the tracked unit, and
the second outer surface is provided with a plurality of second light-emitting units arranged side by side in the extending direction of the tracked unit.

5. The input device according to claim 4, wherein positions of the plurality of first light-emitting units and positions of the plurality of second light-emitting units are offset from each other in the extending direction of the tracked unit.

6. The input device according to claim 1, wherein, in a cross section perpendicular to the extending direction of the tracked unit, a distance from an apex portion between the first outer surface and the second outer surface to the first light-emitting unit is larger than a distance from the apex portion to the second light-emitting unit.

7. The input device according to claim 1, wherein, in a cross section perpendicular to the extending direction of the tracked unit, a width of the first outer surface is larger than a width of the second outer surface.

8. The input device according to claim 1, wherein an outer surface of the tracked unit including a boundary between the first outer surface and the second outer surface is configured to function as the light shield portion.

9. The input device according to claim 1, further comprising: an exterior member that includes the first outer surface and the second outer surface, the exterior member including a portion configured to function as the light shield portion.

10. The input device according to claim 1, wherein the tracked unit includes a frame disposed inside the first outer surface and the second outer surface and supporting the plurality of light-emitting units, the frame including a portion configured to function as the light shield portion.

11. The input device according to claim 1, wherein
the first outer surface is provided with a plurality of first light-emitting units arranged side by side in the extending direction of the tracked unit,
the second outer surface is provided with a plurality of second light-emitting units arranged side by side in the extending direction of the tracked unit, and
the light shield portion extends in the extending direction of the tracked unit.

12. The input device of claim 1, wherein, in a cross section perpendicular to the extending direction of the tracked unit, the first light-emitting unit is located within a range corresponding to two-thirds of a width of the first outer surface from a rear end portion of the first outer surface.

13. The input device of claim 1, wherein the tracked unit further comprises:
a substrate disposed between the first outer surface and the second outer surface;
a first light guide between the first outer surface and the substrate; and
a second light guide between the second outer surface and the substrate;
wherein the first light-emitting unit is on the substrate, and the first light guide is configured to guide light from the first light-emitting unit, and
wherein the second light-emitting unit is on the substrate, and the second light guide is configured to guide light from the second light-emitting unit.

14. The input device of claim 13, wherein the substrate comprises a first surface facing the first outer surface and a second surface facing the second outer surface, and
wherein the first light guide is between the first outer surface and the first surface of the substrate, and
wherein the second light guide is between the second outer surface and the second surface of the substrate.

15. The input device of claim 14, wherein the tracked unit further comprises a transparent exterior member that includes the first outer surface and the second outer surface.

16. The input device of claim 13, wherein the tracked unit further comprises:
a transparent exterior member comprising the first outer surface and the second outer surface; and
a wall member between the exterior member and the substrate, comprising a light shield portion.

* * * * *